Patented July 25, 1950

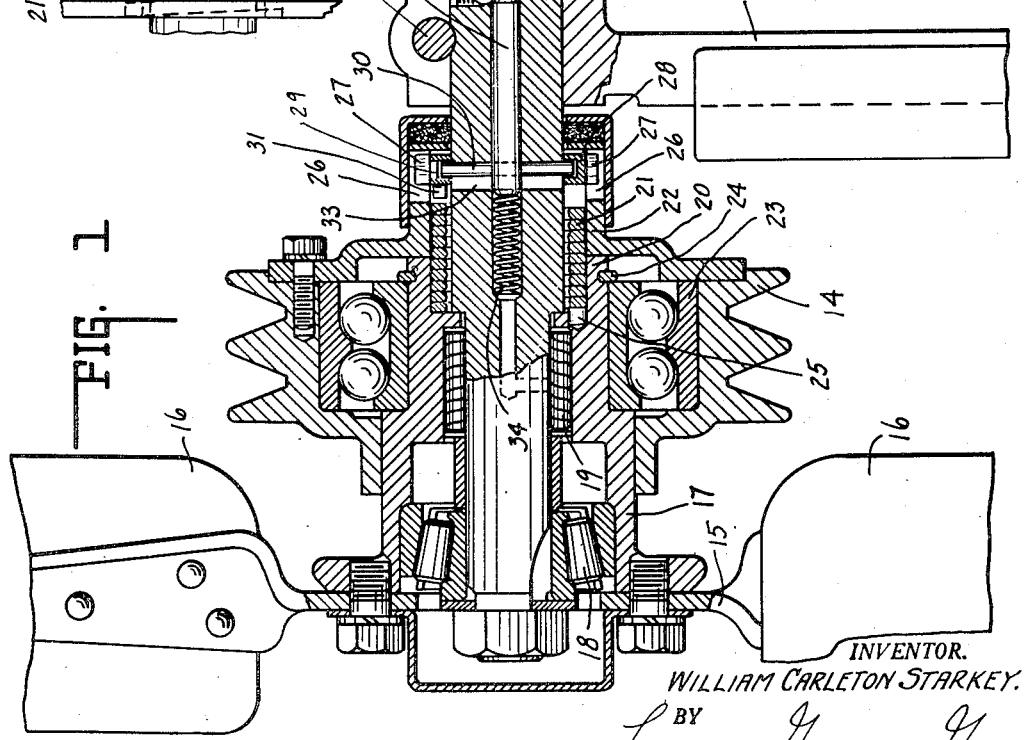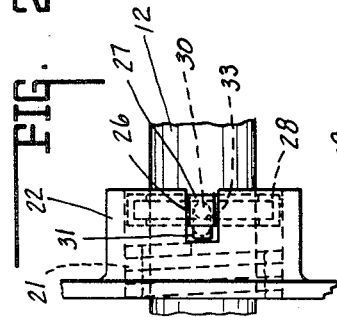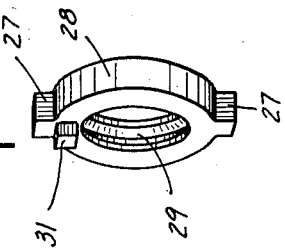

2,516,269

UNITED STATES PATENT OFFICE 2,516,269

SPRING CLUTCH DEVICE

William Carleton Starkey, Indianapolis, Ind.; Fletcher Trust Company executor of said William Carleton Starkey, deceased Application May 10, 1945, Serial No. 593,042

9 Claims. (Cl. 192—41)

This invention relates to a spring clutch device wherein it is made possible to clutch and declutch a driven member from a rotating driving member, and particularly wherein the clutch may be controlled by an actuating means capable of functioning in accordance with temperature variations. The invention is applicable to many varying uses, but for illustration it is herein disclosed as applied to a thermostatic control for the cooling system of an automobile engine.

It is recognized that before an internal combustion engine is sufficiently warmed up it is undesirable to drive the cooling fan. Therefore, one purpose of this invention is to provide a clutch connection controlled by the temperature of the engine in such manner that the fan will be declutched from the fan pulley until the temperature has risen to a predetermined degree, whereupon the clutch connection will be actuated to clutching position. The fan will then be driven by the pulley until such time as the temperature of the engine has dropped below the point wherein the engine will efficiently operate.

The full nature of the invention will be understood from the accompanying drawings and the following description and claims:

Fig. 1 is a central vertical section through an automobile cooling system fan and a part of a cylinder block with a thermostatic control in elevation, the control being so positioned that the fan is declutched from its driving pulley.

Fig. 2 is a plan view of the driving member pocket or pulley hub with the associated clutch energizing collar.

Fig. 3 is a perspective view of the energizing collar.

In the drawings there is shown the front end of a cylinder block for an engine or other source of heat, indicated at 10. Spaced therefrom and fixedly mounted in connection with the engine in the usual manner there is a fan supporting bracket 11. Said bracket 11 supports the rear end of a fixed spindle 12 locked to the support by a locking bolt 13. Said spindle extends forwardly of the support to rotatably mount a fan pulley 14 driven by the usual fan belt, not shown. Said spindle also supports the cooling fan comprising the fan spider 15 and fan blades 16.

The fan spider is secured by suitable bolts to the driven member or fan hub 17 supported for rotation about the spindle upon the roller bearings 18, 19. Said driven member or fan hub has its rear end provided with an internal clutch or driven pocket 20 to receive a portion of the clutch spring 21.

Mounted about and secured to the fan hub 16 there is a ball race 23 locked thereon by a locking ring 24. Said ball race carries and supports for rotation relative to the hub the fan pulley or driving member 14. Secured to the pulley there is a hub-like driving pocket which rotates with the fan pulley or driving member when the engine is running. Said driving pocket is coaxial and in alignment with the driven pocket 22 for receiving an adjacent portion of the clutch spring 21 therein. However, the clutch spring is normally free of clutching engagement with the inner clutch surface of the driving pocket, whereas it is normally in clutching engagement with the driven pocket 20 and preferably pinned to the hub 17 by an outwardly extending toe 25 in the end thereof. Thus, under normal conditions with the motor running or the driving member rotating, the driven member or fan will remain stationary. The driving pocket 22 will rotate about and free of that portion of the clutch spring 21 embraced thereby.

The driving member or pocket 22 is provided with opposed slots 26 to slidably receive and interlock with a radially extending driving lug 27 externally mounted on opposite sides of an energizing collar 28 to provide a key and slot driving engagement therebetween, whereby said energizing collar 28 will rotate with the driving pocket and at the same time be longitudinally slidable relative thereto.

Said energizing collar is internally grooved as indicated at 29, to receive an actuating pin 30, said pin being stationary and the collar being adapted to rotate thereabout. On the forward face of said energizing collar there is provided a clutch energizing lug 31 positioned to slide toward and away from the free end of the clutch spring embraced by the driving pocket, or a projection carried by the end portion of the spring.

The actuating pin 30 extends through, to be mounted and carried by, an actuating plunger 32. Said plunger is slidably mounted in a suitable bore formed centrally and longitudinally in the rear portion of the spindle 12. Said spindle is also provided with a suitable transverse slot 33 to permit relative movement therein of the actuating pin 30. In a continuation of said bore there is mounted a compression spring 34 exerting pressure against the end of the plunger to normally maintain said plunger and actuating pin in retracted or ineffective position. Said plunger is provided at its opposite end with a connection 35 for an actuating rod 36, said rod being removably locked to said plunger by a set screw 37. Said plunger is also provided with a pair of adjacent detents 38 to receive a spring pressed latching ball 39, whereby said plunger will be latched in its actuating or retracted inoperative position respectively.

The opposite end of the actuating rod 36 from that end connected with the plunger has mounted thereon a head 40 slidably extending into a housing 41 to engage and bear against a bellows thermostat 42. Said thermostat is supported upon a diaphragm 43 extending over an aperture 44 provided in the cylinder block for communication with the liquid cooling system of the engine.

In operation when the engine is at the "cool" temperature, the thermostat 42 will be contracted, permitting the spring 34 to maintain the actuating plunger 32 in its retracted or inoperative position, as shown in the drawings. In this position the energizing collar 28 will be positioned by the pin 30 so that its energizing lug 31 will be out of the path of rotation of the clutching spring 21. Thus, the fan pulley which, with the engine running, is continuously rotating, will rotate relative to the fan about the bearings 23 without driving it and the fan will remain stationary together with the driven pocket of its hub and the clutch spring connected therein. This will permit of relative rotation between the driving pocket and spring.

However, when the engine has reached a predetermined temperature, the thermostat will expand to force the actuating plunger against the spring to a position where the latching ball 39 drops into the adjacent pocket 38. In this position of the plunger, through the pin 30, it will have moved the energizing collar toward the clutch spring in position for the energizing lug of said collar to engage the end of the spring due to the fact that said collar is being rotated by the driving member or fan pulley. Upon the energizing lug striking the end of the spring it will tend to expand the clutch spring into clutching engagement with the driving pocket 22, whereby both pockets will be interconnected through the clutching action of the spring for causing the driven member to be driven by the driving member.

Conversely, upon the engine again cooling down, the thermostat will contract and the spring 34 will move the actuating plunger to retracted position. The energizing lug 31 will then be moved out of engagement with the clutch spring, whereupon it will return under its inherent tension to declutching position.

As shown in dotted lines in Fig. 1, the actuating rod 36 is sufficiently flexible to permit of misalignment between the fan spindle 12 and the plunger 40 of the rod.

Whereas the invention has been described as applied to the thermostatic control of an automobile cooling fan, it will be appreciated that it has other applications, wherein it may be desired to thermostatically control the interdriving connection between two members, or drive a normally stationary member by a rotating member under manual, centrifugal or other automatic means for controlling the actuating plunger.

The invention claimed is:

1. A thermostatically controlled spring clutch device including a driving member having an internal cylindrical clutch pocket, a driven member having a coaxial clutch pocket extending in alignment with said first-mentioned pocket, said members being supported to permit relative rotation therebetween, a clutch spring mounted in said pockets operably connected to said driven member and expandable into clutching engagement with said driving member pocket, an energizing collar rotatable with said driving member movable into and out of position to engage and expand said spring to clutching engagement with said driving member pocket, a temperature controlled thermostat, a sliding plunger connected with said energizing collar operable by said thermostat to move it to a clutch engaging position, a compression spring for moving said collar out of clutch engaging position upon release of said thermostat, and a latch for releasably latching said plunger in one or the other positions.

2. A spring clutch device including a driving member, a driven member, a stationary spindle rotatively supporting said members for relative rotation therebetween, each of said members being provided with coaxial clutch surfaces extending in alignment with each other, a clutch spring associated with said clutch surfaces having one end portion connected with said driven member and the other end portion normally out of clutching engagement with said driving member and adapted to be moved into clutching engagement therewith, an energizing collar rotatable with said driving member and longitudinally slidable on said spindle, means for moving said collar towards said clutch spring while said collar is rotating with said driving member, and an energizing projection on said collar movable therewith to position for rotative engagement with the end portion of said spring to move it into clutching engagement with said driving member.

3. A spring clutch device including a driving member, a driven member, a stationary spindle for rotatively supporting said members for relative rotation therebetween, each of said members being provided with a coaxial clutch surface extending in alignment with each other, a clutch spring associated with said clutch surfaces having one end portion connected with said driven member and the other end portion normally out of clutching engagement with said driving member and adapted to be moved into clutching engagement therewith, an energizing collar rotatable with said driving member and longitudinally slidable on said spindle, an actuating element carried by said spindle having operative engagement with said collar for moving said collar towards said spring clutch while rotating about said spindle, and an energizing projection on said collar movable therewith to position for rotative engagement with the end portion of said spring to move it into clutching engagement with said driving member.

4. A spring clutch device including a driving member having an internal cylindrical clutch pocket, a driven member having a coaxial clutch pocket extending in alignment with said first-mentioned pocket, said members being supported to permit relative rotation therebetween, a spring clutch mounted in said pockets operably connected to said driven member and expandable into clutching engagement with said driving member pocket, an energizing collar rotatable with said driving member movable into and out of position to engage and expand said spring to clutching engagement with said driving member pocket, a sliding plunger connected with said rotating collar operable to move it to a clutch engaging position, a compression spring for moving said collar out of clutch engaging position, and a latch for releasably latching said plunger in one or the other positions.

5. A spring clutch device including a driving member, a driven member, a stationary spindle for rotatively supporting said members for relative rotation therebetween, each of said members being provided with a coaxial clutch surface extending in alignment with each other, a clutch spring associated with said clutch surfaces having one end portion connected with said driven member and the other end portion normally out of clutching engagement with said driving member and adapted to be moved into clutching engagement therewith, an energizing collar rotatable with said driving member and longitudinally slidable on said spindle, said collar being internally grooved to receive an actuating pin non-rotative therewith, a spring pressed plunger slidable on said spindle connected with said actuating pin to move it longitudinally of said spindle for positively moving said rotating collar into and out of energizing position relative to said spring, and an energizing projection on said collar movable therewith to position for rotative engagement with the end portion of said spring to move it into clutching engagement with said driving member.

6. A thermostatically controlled spring clutch device including a driving member and a driven member, said members having coaxial cylindrical clutch surfaces extending in alignment and supported to permit relative rotation therebetween, a clutch spring associated with said clutch surfaces having one end portion thereof connected to one of said members and the opposite end portion thereof movable into and out of clutching engagement with the other said member, an energizing collar rotatable with the said other member movable into and out of position to engage said spring and move it into clutching engagement with the said other member upon relative rotation therebetween, a temperature controlled thermostat, a sliding plunger operably connected with said energizing collar movable by said thermostat to position said collar for energizing engagement with said clutch spring, a compression spring normally acting to move said collar from clutch engaging position upon release of said thermostat, and a latch for releasably latching said plunger in one or the other of said positions.

7. A spring clutch device including a driving member and coaxial driven member, a stationary spindle for rotatively supporting said members for relative rotation, the driving member having a circular clutch surface, a helical clutch spring operatively connected with said driven member to turn therewith in one direction of rotation thereof and having a series of coils peripherally adjacent but normally out of clutching engagement with said clutch surface and adapted to be moved into clutching engagement therewith, an energizing collar rotatable with said driving member and longitudinally slidable on said spindle, means for moving said collar toward said clutch spring while said collar is rotating with said driving member, and an energizing element on said collar movable therewith to clutch-spring-energizing rotative engagement with a terminal one of said series of coils.

8. A thermostatically controlled spring clutch device including a driven member and a helical clutch spring connected to turn therewith, a driving member having a circular clutch surface coaxial with the driven member, peripherally adjacent the spring and normally clutchingly disengaged therefrom, an energizing collar rotatable with said driving member movable into and out of position to engage said spring and move it into clutching engagement with said circular clutch surface, a temperature controlled thermostat, a sliding plunger operatingly interposed between said energizing collar and the thermostat whereby the latter can move the collar from a clutch-disengaging position to a clutch-engaging position, and spring means normally urging the collar toward its clutch disengaging position.

9. A thermostatically controlled spring clutch device including coaxial relatively rotatable driving and driven members, one having a circular clutch surface, a helical clutch spring connected to turn with the other member and having coils peripherally adjacent said clutch surface and movable into and out of clutching engagement therewith, an energizing collar rotatable with said other member and movable into and out of position to engage said spring and move it into clutching engagement with the said clutch surface upon relative rotation of the members in one direction, a temperature controlled thermostat, a sliding plunger operably connected with said energizing collar and movable by said thermostat to position said collar for energizing engagement with said clutch spring, and a spring normally acting to move said collar from clutch engaging position upon release by said thermostat.

WILLIAM CARLETON STARKEY.

REFERENCES CITED

The following references are of record in the file of this patent:

UNITED STATES PATENTS

| Number | Name | Date |
| --- | --- | --- |
| 678,546 | Corson | July 16, 1901 |
| 1,170,730 | Benjamin et al | Feb. 8, 1916 |
| 1,374,901 | Blankenhorn | Apr. 19, 1921 |
| 1,433,399 | Modine | Oct. 24, 1922 |
| 1,629,420 | Starkey | May 17, 1927 |
| 1,820,035 | Stokes | Aug. 25, 1931 |
| 1,921,042 | Roos | Aug. 8, 1933 |
| 1,934,783 | Arterburn | Nov. 14, 1933 |
| 2,052,961 | Bonham | Sept. 1, 1936 |

FOREIGN PATENTS

| Number | Country | Date |
| --- | --- | --- |
| 308,235 | Great Britain | of 1929 |